United States Patent
Jin et al.

(10) Patent No.: US 12,217,742 B2
(45) Date of Patent: Feb. 4, 2025

(54) HIGH FIDELITY AUDIO SUPER RESOLUTION

(71) Applicants: Adobe Inc., San Jose, CA (US); The Trustees of Princeton University, Princeton, NJ (US)

(72) Inventors: Zeyu Jin, San Francisco, CA (US); Jiaqi Su, Princeton, NJ (US); Adam Finkelstein, Princeton, NJ (US)

(73) Assignees: Adobe Inc., San Jose, CA (US); The Trustees of Princeton University, Princeton, NJ (US)

( * ) Notice: Subject to any disclaimer, the term of this patent is extended or adjusted under 35 U.S.C. 154(b) by 274 days.

(21) Appl. No.: 17/534,221

(22) Filed: Nov. 23, 2021

(65) Prior Publication Data

US 2023/0162725 A1    May 25, 2023

(51) Int. Cl.
*G10L 15/16*    (2006.01)
*G06N 3/045*    (2023.01)
*G10L 15/06*    (2013.01)

(52) U.S. Cl.
CPC .............. *G10L 15/16* (2013.01); *G06N 3/045* (2023.01); *G10L 15/063* (2013.01)

(58) Field of Classification Search
CPC ....... G10L 25/30; G10L 21/038; G10L 19/02; G10L 21/02; G10L 21/0364; G10L 15/16
See application file for complete search history.

(56) References Cited

U.S. PATENT DOCUMENTS

| | | | |
|---|---|---|---|
| 10,770,063 B2 | 9/2020 | Jin et al. | |
| 11,514,925 B2 | 11/2022 | Jin et al. | |
| 11,985,179 B1* | 5/2024 | Tacer | G10L 21/00 |
| 2002/0138268 A1* | 9/2002 | Gustafsson | G10L 21/038 |
| | | | 704/258 |
| 2020/0243102 A1* | 7/2020 | Schmidt | G10L 19/005 |
| 2021/0166717 A1* | 6/2021 | Wen | G10L 25/90 |
| 2022/0223162 A1* | 7/2022 | Assael | G06N 3/045 |
| 2023/0110255 A1* | 4/2023 | Chen | G10L 19/02 |
| | | | 704/500 |

OTHER PUBLICATIONS

Su et al., "HiFi-GAN: High-Fidelity Denoising and Dereverberation Based on Speech Deep Features in Adversarial Networks," Interspeech 2020, Oct. 2020, pp. 4506-4510.

(Continued)

*Primary Examiner* — Mark Villena
(74) *Attorney, Agent, or Firm* — Nicholson De Vos Webster & Elliott LLP

(57) ABSTRACT

Embodiments are disclosed for generating full-band audio from narrowband audio using a GAN-based audio super resolution model. A method of generating full-band audio may include receiving narrow-band input audio data, upsampling the narrow-band input audio data to generate upsampled audio data, providing the upsampled audio data to an audio super resolution model, the audio super resolution model trained to perform bandwidth expansion from narrow-band to wide-band, and returning wide-band output audio data corresponding to the narrow-band input audio data.

17 Claims, 12 Drawing Sheets

(56) References Cited

OTHER PUBLICATIONS

Tan et al., "Learning Complex Spectral Mapping with Gated Convolutional Recurrent Networks for Monaural Speech Enhancement", IEEE/ACM Trans Audio Speech Lang Process, 2020, 34 pages.
Traer et al., "Statistics of natural reverberation enable perceptual separation of sound and space", Proceedings of the National Academy of Sciences, Nov. 2016, pp. E7856-E7865.
Van Den Oord et al., "WaveNet: A Generative Model for Raw Audio," arXiv:1609.03499v2 [cs.SD], Sep. 2016, pp. 1-15.
Vaswani et al., "Attention Is All You Need", 31st Conference on Neural Information Processing Systems (NIPS2017), 2017, 11 pages.
Wang et al., "Speech Super-Resolution Using Parallel WaveNet," 2018 11th International Symposium on Chinese Spoken Language Processing (ISCSLP), Nov. 2018, pp. 260-264.
Wang et al., "Time-Frequency Loss for CNN Based Speech Super-Resolution," ICASSP 2020—2020 IEEE International Conference on Acoustics, Speech and Signal Processing (ICASSP), Apr. 2020, pp. 861-865.
Williamson et al., "Speech dereverberation and denoising using complex ratio masks", In Acoustics, Speech and Signal Processing (ICASSP), 2017, pp. 5590-5594.
Xu et al., "A regression approach to speech enhancement based on deep neural networks", IEEE/ACM Transactions on Audio, Speech and Language Processing (TASLP), 23(1), Jan. 2015, pp. 7-19.
Bachhav et al., "Artificial Bandwidth Extension Using Conditional Variational Auto-encoders and Adversarial Learning," ICASSP 2020—2020 IEEE International Conference on Acoustics, Speech and Signal Processing (ICASSP), Apr. 2020, pp. 6924-6928.
Bachhav et al., "Efficient Super-Wide Bandwidth Extension Using Linear Prediction Based Analysis-Synthesis," ICASSP 2018—2018 IEEE International Conference on Acoustics, Speech and Signal Processing (ICASSP), Apr. 2018, pp. 1-5.
Bansal et al., "Bandwidth Expansion of Narrowband Speech Using Non-Negative Matrix Factorization," Interspeech 2005—Eurospeech, 9th European Conference on Speech Communication and Technology, Sep. 4-8, 2005, pp. 1-6.
Binkowski et al., "High Fidelity Speech Synthesis with Adversarial Networks," arXiv:1909.11646v2 [cs.SD] Sep. 26, 2019, pp. 1-15.
Cao et al., "CREMA-D: Crowd-sourced Emotional Multimodal Actors Dataset", IEEE Transactions on Affective Computing, 5(4), 2014, pp. 377-390.
Chen et al., "Continuous Speech Separation with Conformer", arXiv:2008.05773v2 [eess.AS], Oct. 2020, 5 pages.
Choi et al., "Phase-aware Single-stage Speech Denoising and Dereverberation with U-Net", arXiv:2006.00687v1 [eess.AS], Jun. 1, 2020, 5 pages.
Defossez et al., "Real Time Speech Enhancement in the Waveform Domain", arXiv:2006.12847v3 [eess.AS], Sep. 6, 2020, 5 pages.
Donahue et al., "Exploring Speech Enhancement with Generative Adversarial Networks For Robust Speech Recognition", IEEE International Conference on Acoustics, Speech and Signal Processing, arXiv:1711.05747v2 [cs.SD], Oct. 2018, 6 Pages.
Eaton et al., "Estimation of room acoustic parameters: The ACE Challenge", IEEE/ACM TASLP, 24(10), Jun. 2016, pp. 1681-1693.
Eskimez et al., "Adversarial Training for Speech Super-Resolution," IEEE Journal of Selected Topics in Signal Processing, Apr. 2019, pp. 1-12.
Feng et al., "Learning Bandwidth Expansion Using Perceptually-motivated Loss," ICASSP 2019—2019 IEEE International Conference on Acoustics, Speech and Signal Processing (ICASSP), Apr. 2019, pp. 606-610.
Fu et al., "MetricGAN: Generative Adversarial Networks based Black-box Metric Scores Optimization for Speech Enhancement", Proceedings of the 36th International Conference on Machine Learning, 2019, 11 pages.

Gulati et al., "Conformer: Convolution-augmented Transformer for Speech Recognition", arXiv:2005.08100v1 [eess.AS], May 2020, 5 pages.
Gupta et al., "Speech Bandwidth Extension with Wavenet," arXiv:1907.04927v1 [eess.AS], Jul. 2019, pp. 1-4.
Han et al., "Learning spectral mapping for speech dereverberation and denoising.", 2014 IEEE International Conference on Acoustics, Speech and Signal Processing (ICASSP), 2014, pp. 4661-4665.
Hao et al., "Fullsubnet: A full-band and sub-band fusion model for real-time single-channel speech enhancement", arXiv:2010.15508v2 [eess.AS], Jan. 2021, 5 pages.
Hu et al., "DCCRN: Deep Complex Convolution Recurrent Network for Phase-Aware Speech Enhancement", arXiv:2008.00264v4 [eess.AS], Sep. 2020, 5 pages.
Isik et al., "PoCoNet: Better Speech Enhancement with Frequency-Positional Embeddings, Semi-Supervised Conversational Data, and Biased Loss", arXiv:2008.04470v1 [eess.AS], Aug. 2020, 5 pages.
Jax et al., "Artificial bandwidth extension of speech signals using MMSE estimation based on a hidden Markov model," 2003 IEEE International Conference on Acoustics, Speech, and Signal Processing, (ICASSP '03), Apr. 2003, pp. 1-680-1-683.
Jin et al., "FFTNet: A Real-Time Speaker-Dependent Neural Vocoder," 2018 IEEE International Conference on Acoustics, Speech and Signal Processing (ICASSP), Apr. 2018, pp. 2251-2255.
Kameoka et al., "StarGAN-VC: Non-parallel many-to-many voice conversion with star generative adversarial networks," arXiv:1806.02169v2 [cs.SD], Jun. 2018, pp. 1-9.
Kinoshita et al., "The reverb challenge: A common evaluation framework for dereverberation and recognition of reverberant speech", IEEE Workshop on Applications of Signal Processing to Audio and Acoustics, Oct. 20-23, 2013, 4 pages.
Koizumi et al., "Df-conformer: Integrated architecture of conv-tasnet and conformer using linear complexity self-attention for speech enhancement", In 2021 IEEE Workshop on Applications of Signal Processing to Audio and Acoustics (WASPAA), Oct. 17-20, 2021, arXiv:2106.15813v2 [eess.AS], 5 pages.
Kuleshov et al., "Audio Super Resolution using Neural Networks." ICLR 2017, arXiv:1708.00853v1 [cs.SD], Aug. 2017, pp. 1-8.
Kumar et al., "MelGAN: Generative Adversarial Networks for Conditional Waveform Synthesis," 33rd Conference on Neural Information Processing Systems (NeurIPS 2019), arXiv:1910.06711v3 [eess.AS], Dec. 2019, pp. 1-14.
Li et al., "A Deep Neural Network Approach To Speech Bandwidth Expansion", 2015 IEEE International Conference on Acoustics, Speech and Signal Processing (ICASSP), 2015, pp. 4395-4399.
Li et al., "Speech Audio Super-Resolution For Speech Recognition," Interspeech 2019, Sep. 2019, pp. 3416-3420.
Li et al., "Speech Bandwidth Extension Using Generative Adversarial Networks", 2018 IEEE International Conference on Acoustics, Speech and Signal Processing (ICASSP), 2018, pp. 5029-5033.
Ling et al., "Waveform Modeling and Generation Using Hierarchical Recurrent Neural Networks for Speech Bandwidth Extension," arXiv:1801.07910v1 [cs.SD], Jan. 2018, pp. 1-11.
Macartney et al., "Improved Speech Enhancement with the Wave-U-Net", arXiv:1811.11307v1 [cs.SD], Nov. 2018, 5 pages.
Mack et al., "Single-Channel Dereverberation Using Direct MMSE Optimization and Bidirectional LSTM Networks", Proc. Interspeech, Sep. 2-6, 2018, 5 pages.
Maiti et al., "Speaker independence of neural vocoders and their effect on parametric resynthesis speech enhancement", In ICASSP 2020-2020 IEEE International Conference on Acoustics, Speech and Signal Processing (ICASSP), Nov. 2019, arXiv:1911.06266v1 [cs.SD], 5 pages.
Manocha et al., "A differentiable perceptual audio metric learned from just noticeable differences", Proc. Interspeech 2020, arXiv:2001.04460v2, 6 pages.
Mittag et al., "NISQA: A Deep CNN-Self-Attention Model for Multidimensional Speech Quality Prediction with Crowdsourced Datasets," arXiv:2104.09494v1 [eess.AS], Apr. 2021, 5 pages.
Mysore et al., "Can we Automatically Transform Speech Recorded on Common Consumer Devices in Real-World Environments into

(56) References Cited

OTHER PUBLICATIONS

Professional Production Quality Speech?—A Dataset, Insights, and Challenges," IEEE Signal Processing Letters, vol. 22, No. 8, Aug. 2015, pp. 1006-1010.

Nagrani et al., "VoxCeleb: a large-scale speaker identification dataset", Proc. Interspeech, May 2018, 6 pages.

Panayotov et al., "Librispeech: an asr corpus based on public domain audio books", IEEE International Conference on Acoustics, Speech and Signal Processing, 2015, 5 pages.

Pascual et al., "Towards Generalized Speech Enhancement with Generative Adversarial Networks", Proc. Interspeech, 2019, arXiv:1904.03418v1 [cs.SD], 5 pages.

Pascual et al., "SEGAN: Speech Enhancement Generative Adversarial Network," arXiv:1703.09452v3 [cs.LG], Jun. 2017, pp. 1-5.

Polyak et al., "High fidelity speech regeneration with application to speech enhancement", arXiv:2102.00429v1 [cs.SD], Jan. 2021, 5 pages.

Qian et al., "F0-consistent many-to-many non-parallel voice conversion via conditional autoencoder," ICASSP, arXiv:2004.07370v1 [eess.AS], Apr. 2020, 5 pages.

Reddy et al., "The Interspeech 2020 Deep Noise Suppression Challenge: Datasets, Subjective Speech Quality and Testing Framework", Interspeech 2020, 5 pages.

Rethage et al., "A Wavenet for Speech Denoising", IEEE International Conference on Acoustics, Speech and Signal Processing (ICASSP), arXiv:1706.07162v3 [cs.SD], Jan. 2018, 11 pages.

Salimans et al., "Weight Normalization: A Simple Reparameterization to Accelerate Training of Deep Neural Networks," arXiv:1602.07868v3 [cs.LG], Jun. 2016, pp. 1-11.

Schmidt et al., "Blind Bandwidth Extension Based on Convolutional and Recurrent Deep Neural Networks," 2018 IEEE International Conference on Acoustics, Speech and Signal Processing (ICASSP), 2018, pp. 5444-5448.

Seetharaman et al., "VoiceAssist: Guiding Users to High-Quality Voice Recordings", ACM CHI 2019, May 4-9, 2019, 6 pages.

Seo et al. "A maximum a Posterior-based reconstruction approach to speech bandwidth expansion in noise," 2014 IEEE International Conference on Acoustics, Speech and Signal Processing (ICASSP), May 2014, pp. 6128-6132.

Shen et al., "Natural TTS Synthesis by Conditioning WaveNet on Mel Spectrogram Predictions", In 2018 IEEE international conference on acoustics, speech and signal processing (ICASSP), arXiv:1712.05884v2 [cs.CL], Feb. 2018, 5 pages.

Su et al., "Perceptually-Motivated Environment-Specific Speech Enhancement", In ICASSP 2019 IEEE International Conference on Acoustics, Speech and Signal Processing, Apr. 2019, pp. 7015-7019.

\* cited by examiner

HIGH FIDELITY AUDIO SUPER RESOLUTION

BACKGROUND

Bandwidth extension (BWE) aims to estimate missing high-frequency content, or in other words, to increase the resolution of a speech signal, usually from 4 k-8 kHz to 16 kHz. Early works in this area estimate the wideband spectral parameters, such as its spectral envelope and gain, from those of the narrowband. They utilize techniques including non-negative matrix factorization, linear predictive coding, hidden Markov models, and Gaussian mixture models. The use of deep learning has significantly improved performance over the traditional methods by enabling greater modeling power. For example, deep learning techniques have been used to estimate the log-power spectrogram (LPS) of the upperband from that of the narrowband using various network architectures.

While the spectral methods are good at compensating energy for the missing frequencies, the estimated spectrogram usually lacks details due to the smoothing effects of the commonly used MSE and MAE objective functions. They do not eliminate noise and artifacts not represented in the time-frequency domain either. To reconstruct waveform from the estimation, the wideband phase is approximated by repeatedly flipping the narrowband phase, but this process often introduces artifacts. Additionally, advances in network architectures have enabled audio processing directly on waveforms.

These deep learning-based audio methods are developed over a sample rate of 16 kHz or 22 kHz and cannot be used for high fidelity applications. Additionally, existing audio super-resolution techniques are not capable of converting low sample rate audio samples to high fidelity sample rate audio samples. As a result, audio captured through a wide range of common devices, such as Bluetooth devices, voice recorders, video conferencing software, smartphones, etc. cannot be used in audio and video production without compromised sound quality.

These and other problems exist with regard to audio super resolution in electronic systems.

SUMMARY

Introduced here are techniques/technologies that enable audio super resolution (also referred to as bandwidth extension) on narrowband input audio data (e.g., less than 44 kHz) to generate full-band audio data (e.g., at least 44 kHz). Humans are capable of hearing approximately 20 kHz of frequencies. However, amateur level audio recordings are typically made at 16 kHz. This provides 8 kHz of audio frequencies, leaving approximately 12 kHz of frequencies missing. This leads to a noticeable reduction in audio quality and makes such narrowband audio unusable for professional productions. Embodiments utilize an audio super resolution model trained to generate plausible missing high frequency data for a narrowband input audio to generate full-band output audio. This enables users to record audio with commonly available equipment (e.g., smart phones, laptops, other mobile devices, etc.) and to use this audio in more professional productions without a noticeable drop in audio quality.

More specifically, in one or more embodiments, the audio super resolution model is trained as a generator network in a generative adversarial network along with multiple discriminator networks. The discriminator networks include a spectrogram discriminator network and multiple waveform discriminator networks. Both spectral and waveform losses are used to train the networks which results in the audio super resolution model learning to predict plausible high frequency data for input narrowband audio. Once trained, the audio super resolution model can then be deployed to receive arbitrary narrowband input audio and produce corresponding full-band audio that is often indistinguishable from real full-band audio to listeners.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
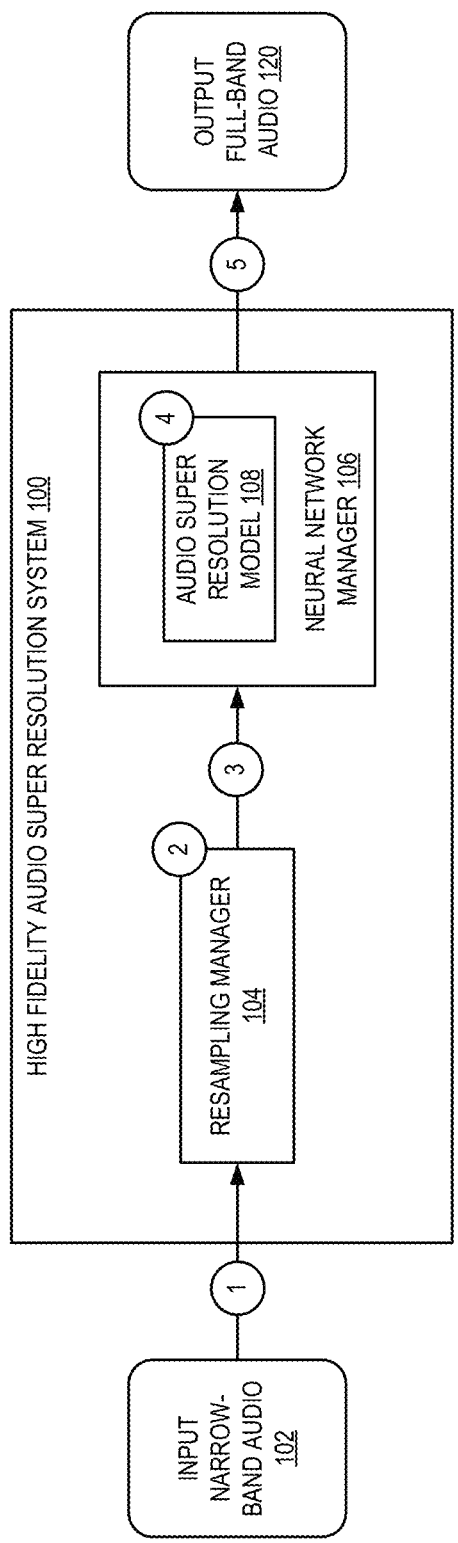
FIG. 1 illustrates a diagram of a process of performing high fidelity audio super resolution to generate wideband audio from narrowband audio in accordance with one or more embodiments.

One or more embodiments of the present disclosure include a high-fidelity audio super resolution system to generate wideband audio data (e.g., 44 kHz or higher) from narrowband input audio data (e.g., less than 44 kHz audio data). Embodiments use a generative adversarial network (GAN) to perform bandwidth extension (BWE), also referred to herein as audio super resolution, to extend recorded speech from, e.g., 16 kHz to 48 kHz, such that the result is typically indistinguishable from real full bandwidth recordings. Moreover, even when used to extend audio from 8 kHz to 48 kHz, it significantly improves quality, and outperforms baseline techniques. The audio super resolution GAN includes a generator model and a plurality of discriminator models. The discriminator models include a spectrogram discriminator network and multiple waveform discriminator networks for the signal at different resolutions. Once trained, the generator model can be used to perform bandwidth extension on any arbitrary speech input narrowband audio to obtain full band audio.

A variety of speech generation and processing applications target 16 kHz audio signals, including vocoders for text-to-speech (TTS) synthesis, voice conversion, source separation, and speech denoising and enhancement. This 16 kHz sampling rate constitutes a "sweet spot" in the trade-off between intelligibility and computational cost: speech content is fully encompassed within the corresponding frequency range, while audio processing is not too expensive. However, the resulting sound quality remains unsatisfactory for some user listening experiences, as a sense of presence and environment is lost.

Traditional bandwidth extension (BWE) research has focused on lifting narrow-band signals to 16 kHz (from 4-8 kHz), primarily for telephony. Bandwidth extension aims to estimate the missing high-frequency content, or in other words, to increase the resolution of a speech signal, usually from 4 k-8 kHz to 16 kHz. The early works estimate the wideband spectral parameters, such as its spectral envelope and gain, from those of the narrowband. They utilize techniques including non-negative matrix factorization, linear predictive coding, hidden Markov models and Gaussian mixture models.

The use of deep learning has significantly improved performance over the traditional methods by enabling greater modeling power. For example, some techniques have used deep neural network for estimation of the log-power spectrogram (LPS) of the upperband from that of the narrowband. Various network architectures have been explored, such as variational auto-encoders, U-Nets, and recurrent neural networks. While the spectral methods are good at compensating energy for the missing frequencies, the estimated spectrogram usually lacks details due to the smoothing effects of the commonly used MSE and MAE objective functions. They do not eliminate noise and artifacts not represented in the time-frequency domain either. To reconstruct waveform from the estimation, the wideband phase is approximated by repeatedly flipping the narrowband phase, but this process often introduces artifacts.

The recent advances in network architectures have enabled audio processing directly on waveforms. For example, prior techniques used a convolutional encoder-decoder network inspired by image super resolution. Wave-Net and its variants for BWE use dilated convolutions to enable large receptive field while preserving the original resolution. Several other efforts incorporated time-frequency information while still operating in time domain.

Generative Adversarial Networks (GAN) have recently been explored in audio processing to improve authenticity of speech. The generator is driven to approximate the real data distribution via the dynamic competition with the discriminator. For BWE, its variable discrimination helps to refine details in the high frequencies. The usage of GAN for sound quality has been more thoroughly explored in other domains such as speech synthesis and speech enhancement. For example, HiFi-GAN shows that discrimination in both the time domain and the time-frequency domain is necessary to achieve the best sound quality. Additionally, MelGAN proposed to use the learnt feature space of the discriminator as a distance metric as they dynamically pick up the noticeable differences between the generated audio and the real audio. This feature matching loss stabilizes GAN training and avoids the notorious mode collapse issue by forcing content consistency.

Although GAN techniques have been applied to other audio domain problems, they have not been significantly explored for performing audio super resolution. Additionally, existing audio super resolution techniques typically apply to converting 4-8 kHz audio into 16 kHz audio, to make the audio for various telephony applications usable. However, when these techniques are used to convert narrowband audio, e.g., less than 44 kHz, into full band (also referred to herein as wideband) audio, e.g., greater than 44 kHz, the results are not satisfactory. This typically introduces audio artifacts that reduce the overall quality of the resulting wideband audio. Additionally, many of these techniques work on the audio spectrum, which leads to a loss of phase data in the resulting extended audio.

To address these problems in the art, embodiments utilize a GAN model to generate wideband audio data from narrowband input audio data that is typically indistinguishable from real full bandwidth recordings. This allows users to record audio using common devices (e.g., mobile devices, laptops, etc.) and, once extended, then use this audio in professional applications with little to no discernable loss in audio quality.

FIG. 1 illustrates a diagram of a process of performing high fidelity audio super resolution to generate wideband audio from narrowband audio in accordance with one or more embodiments. As shown in FIG. 1, a high-fidelity audio super resolution system 100 can receive input narrowband audio data 102, at numeral 1. As discussed, as used herein, narrowband generally refers to any audio data of less than 44 kHz. Although embodiments are generally described with respect to receiving narrowband audio data of 16 kHz or 8 kHz, embodiments may be used to perform audio super resolution on arbitrary narrowband signals. For example, 22 kHz audio can be downsampled to 16 kHz and then input at numeral 1. Similarly, 12 kHz audio can be downsampled to 8 kHz before being input at numeral 1. Alternatively, the audio super resolution model may be trained to receive narrowband data having larger or smaller bandwidths. The high-fidelity audio super resolution system 100 can include, or be part of, one or more systems that implement audio editing, audio recording, audio production, etc. Such systems may include, but are not limited to, digital audio workstations such as ADOBE® AUDITION®. The terms, "audio data," "digital audio recording," "audio recording," or "audio input" may refer to electronic data that includes audio recorded over time. For example, a microphone or another type of audio capturing hardware may capture and record audio as a digital audio recording. Also, audio data can be combined or split to form new audio data. Further, audio data can be stored and/or transmitted as audio files for playback on audio playback devices. In some embodiments, a digital audio recording is processed and/or streamed in real-time with or without storing the captured audio in an audio file.

The input audio data can first be received by a resampling manager 104. The resampling manager 104 can resample the input audio data to be the same length as the target extended audio, at numeral 2. For example, if 16 kHz input audio is received at numeral 1, and the target output bandwidth extended audio is 48 kHz, then the resampling manager 104 can resample the 16 kHz input audio to be 48 kHz audio. Although resampled to 48 kHz, no additional audio data is added to the resampled audio. By separating resampling from bandwidth extension, well known resampling techniques may be used to limit or eliminate the risk of introducing artifacts into the resampled audio if it were left to the model to perform the resampling in addition to the bandwidth extension. In some embodiments, the resampling manager can implement any resampling algorithm to perform resampling. For example, in some embodiments, a band-limited sinc interpolation by Python Librosa library ("librosa.resample" default mode) is used. However, any alternative resampling algorithm may be used instead.

At numeral 3, the resampled input audio is provided to a neural network manager 106. The neural network manager 106 may host a machine learning model, such as audio super resolution model 108. As such the neural network manager 106 may include various libraries data structures, and any other hardware or software needed to host and execute the audio super resolution model 108 on audio input data. The audio super resolution model may be a neural network. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the high-fidelity audio super resolution system are discussed further below.

In particular, the audio super resolution model may be a generator network trained as part of a generative adversarial network. For example, the audio super resolution model 108 may be implemented as an end-to-end feedforward WaveNet model. In various embodiments, different generator models may be used. This audio super resolution model 108 receives the resampled narrowband signal and generates a full-band signal, at numeral 4. In some embodiments, the audio super resolution model 108 uses non-casual dilated convolutions with exponentially increasing dilation rates to achieve sufficient temporal context for estimating the high frequency structures. The audio super resolution model 108 may use a power of three (1 to 2187) as the dilation rate as the input audio data is typically upsampled 3× or 6× (e.g., 16 kHz to 48 kHz or 8 kHz to 48 kHz). Experimentally, two WaveNet stacks with channel size 128 were used and found to perform satisfactorily, however other implementation may also be used. Additionally, previous techniques, such as HiFi-GAN used a postnet module. This module is omitted in various embodiments to avoid excess smoothing of the output signal which can reduce high frequency resolution. In some embodiments, weight normalization is used across all the networks (e.g., multiple WaveNet stacks) to speed up convergence.

At numeral 5, the full-band audio 120 is output. This full-band audio can then be used in various audio editing applications that require high fidelity audio to avoid loss of audio quality.

Figure 2:
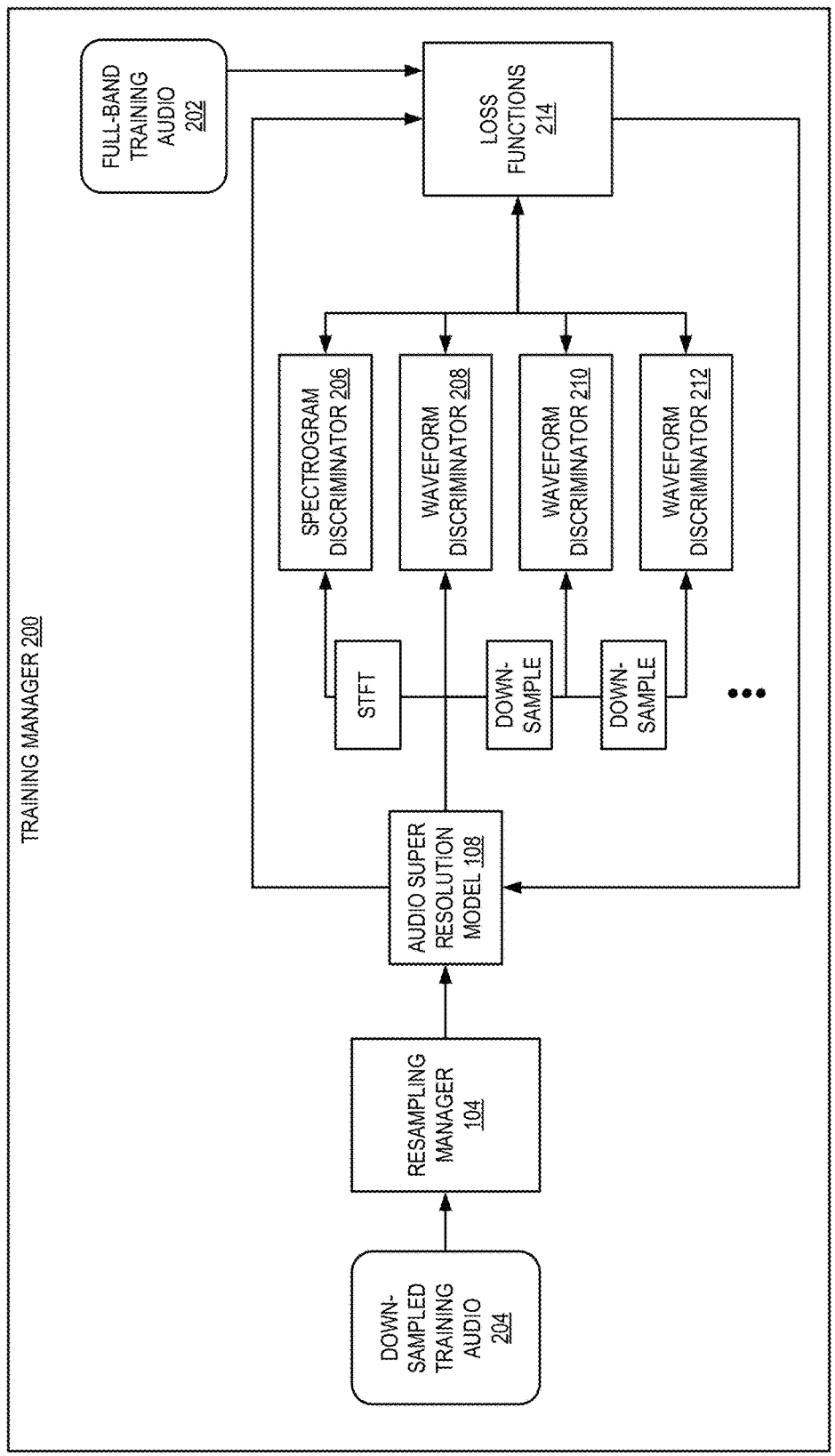
FIG. 2 illustrates a diagram of training an audio super resolution model in accordance with one or more embodiments.

FIG. 2 illustrates a diagram of training an audio super resolution model in accordance with one or more embodiments. In various embodiments, training is performed using discrimination in both the spectral domain and waveform domain. Discrimination in the spectral domain encourages generation of details for the missing bands. As a result of the training, the audio super resolution model (e.g., the generator) learns to generate plausible high frequency data such that the discriminators cannot reliably distinguish the generated fullband data from real fullband data. As shown in FIG. 2, a training manager 200 can be responsible for training the audio super resolution model 108 as part of a GAN, where the audio super resolution model 108 is the generator network and multiple discriminator networks are used. In various embodiments, the training manager 200 may be implemented as part of the high-fidelity audio super resolution system or as part of a separate machine learning service or system which trains models that are then deployed to services and systems, such as the high-fidelity audio super resolution system 100.

The training manager 200 can include, or have access to, full-band training audio 202 and downsampled training audio 204. The full-band training audio 202 may include full-band audio recordings (e.g., from a full-band audio dataset, recorded by a user, or otherwise obtained). In some embodiments, the training manager 200 can downsample the full-band training audio 202 to obtain the downsampled training audio 204. For example, the training audio may include 48 kHz audio data and the downsampling manager can downsample the training audio data to 16 kHz. Alternatively, a training dataset may include full-band and narrowband audio pairs for use in training the audio super resolution model 108.

As discussed above, the downsampled training audio data 204 can first be resampled by resampling manager 104, before it is provided to audio super resolution model 108. The audio super resolution model then generates bandwidth extended audio data which is provided to multiple discriminator networks 206-212. As shown, a spectrogram of the bandwidth extended waveform can be generated (e.g., by a short-time Fourier transform (STFT) module) and provided to a spectrogram discriminator 206. Discrimination in the spectral domain encourages generation of details for the missing bands. The spectrogram discriminator 206 may be used on a full-band 128-coefficient mel-spectrogram of the bandwidth extended waveform. In some embodiments, the spectrogram discriminator 206 may include four stacks of 2D convolution layers, batch normalization and Gated Linear Unit (GLU), and lastly a convolution layer followed by global average pooling. It uses kernel sizes of (7, 7), (4, 4), (4, 4), (4, 4) and stride sizes of (1, 2), (1, 2), (1, 2), (1, 2) for the stacks, and the last convolution layer uses a kernel size of (15, 5). The channel sizes are 32 across all the layers. However, alternative discriminator architectures may also be used.

In addition to the spectrogram discriminator 206, multiple waveform discriminators 208-212, respectively operate at the fullband signal downsampled by different ratios as a power of two. Thus, each waveform discriminator learns features for a different frequency range. For example, waveform discriminator 208 operates on the full 48 kHz waveform, waveform discriminator 210 operates on a downsampled 24 kHz version of the waveform, and waveform discriminator 212 operates on a further downsampled 12 kHz version of the waveform. In various embodiments, the number of waveform discriminators is determined based on the up-sampling scale from the narrowband signal to the fullband signal in the task. For example, for BWE from 8 kHz to 48 kHz, embodiments may use four waveform discriminators operating at 48 kHz, 24 kHz, 12 kHz and 6 kHz sampled versions of the fullband signal. Each waveform discriminator may include a set of grouped convolutions and global average pooling at the end, with Leaky Relu used between the layers. For example, in some embodiments, the kernel sizes are 15, 41, 41, 41, 41, 5, 3; stride sizes 1, 4, 4, 4, 4, 1, 1; channel sizes 16, 64, 256, 1024, 1024, 1024, 1; and group sizes 1, 4, 16, 64, 256, 1, 1. The waveform discriminators contribute significantly to the perceptual qualities of the resulting fullband audio by removing commonly observed metallic artifacts and improving naturalness of unvoiced sound.

Common metric functions used for bandwidth extension do not correlate well with the overall perceptual quality of the generated full-band signal. However, the discriminators learn a representation space for real full-band audio while trying to discriminate whether a provided audio falls in the same representation space as the real ones. Thus, the feature matching loss from each discriminator is also imposed to the generator, which calculates the L1 distance between the deep features of the generated audio and those of the corresponding real full-band audio.

As shown, loss functions 214 are applied to the results of the discriminators as well as those of the audio super resolution model 108 and used to train the discriminator networks as well as the audio super resolution model 108. For example, the loss functions 214 may include a spectrogram loss, mel-spectrogram loss, and a waveform loss which are calculated between the prediction generated by the audio super resolution model 108 and the ground-truth from the full-band training audio 202. The loss functions may also include an adversarial loss calculated from discriminators' results on generator prediction and ground-truth. Additionally, the loss functions 214 may include a feature matching loss calculated from discriminators' deep features on generator prediction and ground-truth. In some embodiments, feature matching loss can be the distance between the deep feature of the generator output and the deep feature of ground truth. The deep feature is an ensemble of all layers' outputs of the discriminator or a subset of all layers' outputs. To compute feature matching loss, embodiments pass the generator output through the discriminator and store the output of every layer (e.g., called $f_1$), then pass the ground truth through the discriminator and store the output of every layer (e.g., called $f_2$), and use a distance function such as L1 or L2 distance to compute the difference between $f_1$ and $f_2$. The spectrogram loss, mel-spectrogram loss, and waveform loss, along with the adversarial loss and feature matching loss may be used to train the audio super resolution model 108. The loss functions 214 may also include discriminator loss used to train the discriminators 206-212 which is calculated from discriminators' results on generator prediction and ground-truth. In particular, the spectrogram loss, mel-spectrogram loss, and waveform loss regularize the network and speed up early convergence of the audio super resolution model 108. In some embodiments, the waveform loss is the absolute difference between prediction and target waveform (e.g., from full-band training audio 202). It helps to match the overall shape and the phase, but it can hinder further optimization once the output signal is close to the ground truth. This is due to the fact that noise is unpredictable: when the ground truth includes high-frequency noise, minimizing L1 or L2 distance will result in predicting the average of noise, which is 0, and thus a loss of high frequency content. Therefore, embodiments also use a spectrogram loss, defined as L1 distance of log spectrograms with different FFT window sizes (e.g., 512, 1024, 2048, and 4096 for 48 kHz fullband signal, each with one-fourth as its hop size).

In addition, in some embodiments, the L1 log mel-spectrogram loss is computed using 128 coefficients for the upperband to focus on the missing high frequency data. These spectrogram losses help to match high frequency components especially noises (presented as predictable constant in spectrogram). However, the use of L1 or L2 distance may still introduce over-smoothing effects that cause new artifacts.

The results of the loss functions 214 are then used to train the discriminator networks and the audio super resolution model. Training may proceed over a number of epochs until the model has converged. Once trained, the audio super resolution model 108 can be deployed to the high-fidelity audio super resolution system to perform bandwidth extension on arbitrary audio inputs.

When used as a post-processing step for other audio applications, the audio super resolution model 108 needs to be robust to various artifacts in the input narrowband signal. For example, the recordings from denoising algorithms may include residuals of noise and reverberation, and the synthesized speech from vocoders may contain robotic sound. These would not be present in the training dataset, since it is derived from studio-quality full-band recordings. Therefore, to match the test-time conditions, embodiments add 15 dB-25 dB noise randomly drawn from the DNS Challenge Dataset to the input narrowband signal during training.

Figure 3:
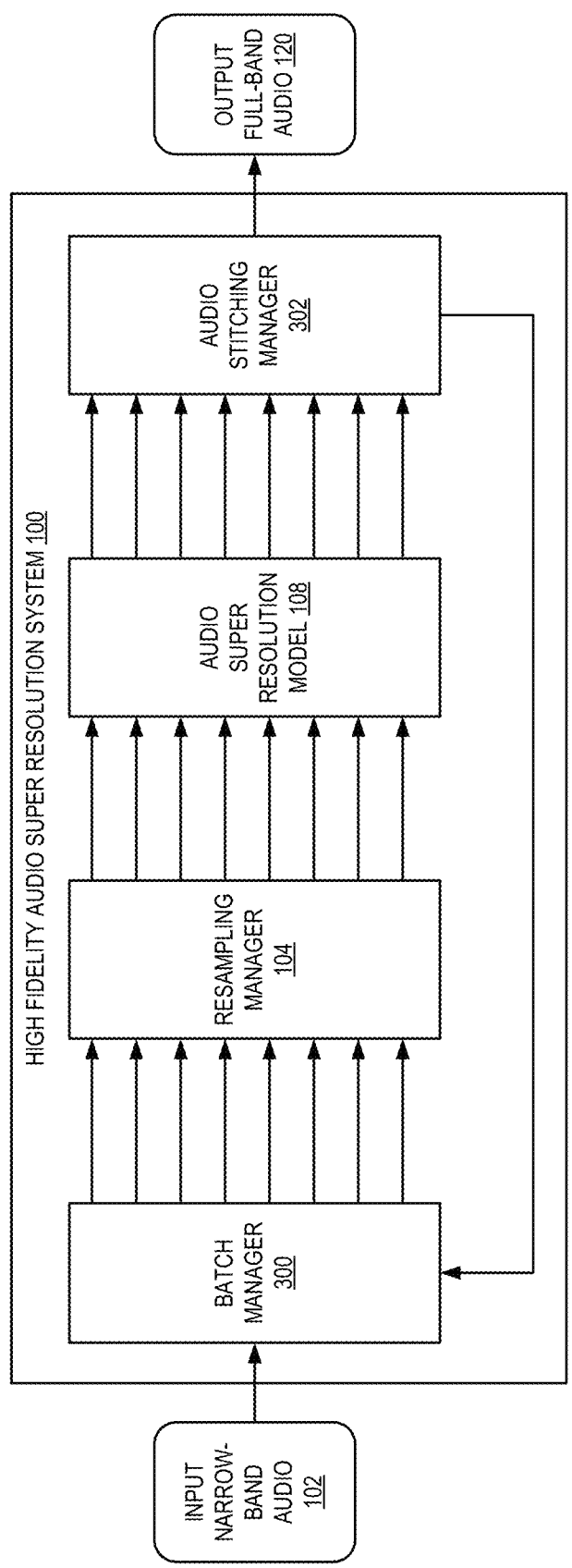
FIG. 3 illustrates a diagram of batch processing of audio data to perform audio super resolution in accordance with one or more embodiments.

FIG. 3 illustrates a diagram of batch processing of audio data to perform audio super resolution in accordance with one or more embodiments. As shown in FIG. 3, to improve processing speed, the audio input data may be divided into batches, which may be processed in parallel by the audio super resolution model 108. The resulting bandwidth extended batches may then be combined into output full-band audio 120. When input narrow-band audio 102 is received by high fidelity audio super resolution system 100, it can first be processed by batch manager 300. Batch manager 300 can divide the input audio data 102 into a plurality of batches. The size of the batches may be fixed or variable. For example, the input audio data 102 may be divided into 8 second chunks. In various embodiments, a fixed batch size may be larger or smaller than 8 seconds. Alternatively, the size of each batch may vary depending on available processing or other computing resources. In some embodiments, the batch size may be a user-configurable parameter.

Once the input audio has been divided into batches, each batch may be processed serially. In some embodiments, when a batch is processed, it is divided into a plurality of sub-batches. For example, an 8 second batch may be divided into eight 1 second sub-batches. The sub-batches may be processed in parallel, as shown in FIG. 3. For example, the sub-batches may first be resampled, as discussed above, by resampling manager 104. In some embodiments, the resampling manager 104 can process the sub-batches in parallel. Alternatively, multiple instances of the resampling manager may be used to process the sub-batches. The resampled sub-batches are then provided to the audio super resolution model 108. In some embodiments, multiple clones of the audio super resolution model are used to process the sub-batches in parallel. Alternatively, a single audio super resolution model 108 may be configured to process sub-batches in parallel.

The result is a plurality of bandwidth extended audio chunks generated by the audio super resolution model 108 (or a plurality of model clones, as discussed). The bandwidth extended chunks are then provided to audio stitching manager 302, which can reassemble the chunks into a complete bandwidth extended batch. Since phase is preserved by the audio super resolution model, the sub-batches can be combined without introducing any audio artifacts. The audio stitching manager 302 can check whether any additional batches exist. For example, the batch manager may be queried. Alternatively, a manifest or other data structure may be made available to the audio stitching manager by the batch manager when the input audio is first processed. The manifest may include a list of batches and sub-batches associated with the input audio. If more batches remain, once processing of one batch is complete, the batch manager can the begin the processing of the sub-batches associated with the next batch. Once all batches have been processed, the audio stitching manager can combine the resulting bandwidth extended batches into the output full-band audio 120 and provide the output audio to the user or system that originated the super resolution request.

Figure 4:
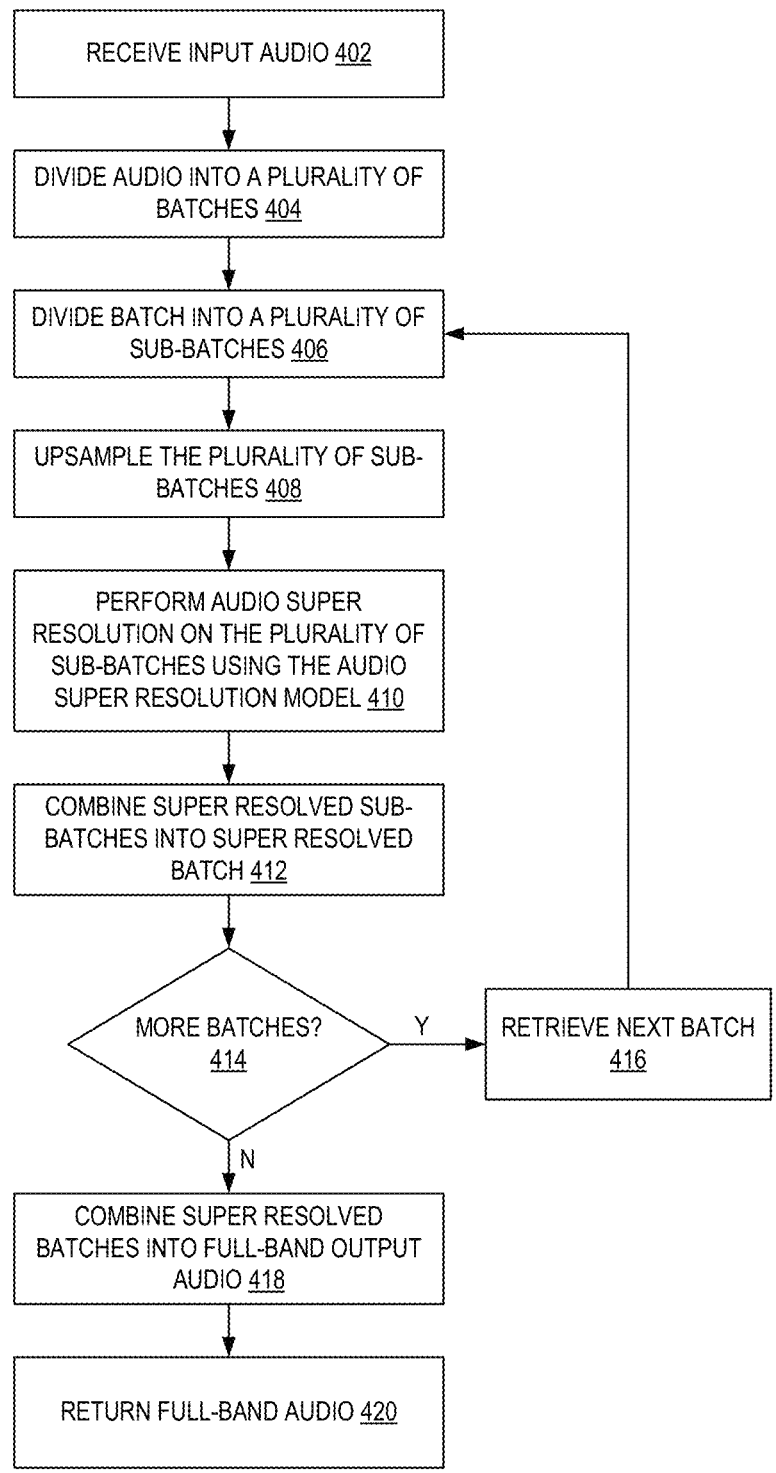
FIG. 4 illustrates a method of batch processing of audio data to perform audio super resolution model in accordance with one or more embodiments.

FIG. 4 illustrates a method of batch processing of audio data to perform audio super resolution model in accordance with one or more embodiments. As shown in FIG. 4, the input audio is received at 402. The input audio is then divided into a plurality of batches at 404. As discussed, this may include fixed or variable sized batches. A first batch for processing can then be divided into a plurality of sub-batches at 406 which will be processed in parallel to improve processing time.

As discussed, the audio associated with each sub-batch is resampled at 408. For example, 16 kHz input audio data is upsampled to at least 44 kHz audio data. The upsampled sub-batches are then provided to the audio super resolution model which generates bandwidth extended audio for each sub-batch at 410. The bandwidth extended sub-batches are then combined into a bandwidth extended batch at 412. At 414, it is determined whether there are any remaining batches to be processed. If so, at 416, the next batch is retrieved, and processing returns to 406. If there are no batches remaining, then the bandwidth extended batches are combined into the full-band output audio at 418 and the resulting full-band output audio is returned at 420.

Figure 5:
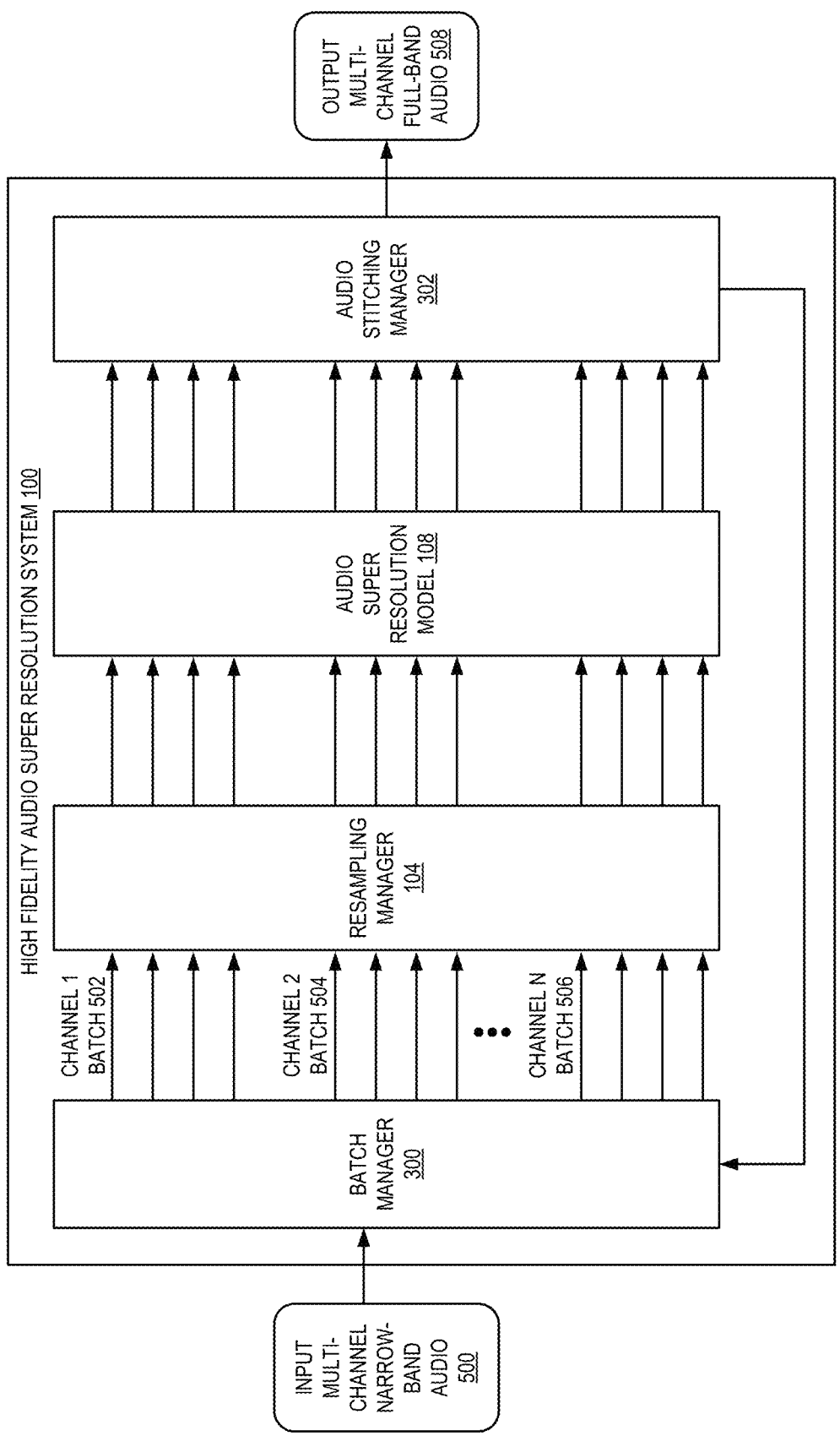
FIG. 5 illustrates a diagram of batch processing of multichannel audio data to perform audio super resolution in accordance with one or more embodiments.

FIG. 5 illustrates a diagram of batch processing of multichannel audio data to perform audio super resolution in accordance with one or more embodiments. In the example of FIG. 5, the input narrowband audio includes multichannel audio 500. Multichannel audio may include stereo audio, surround sound audio, or other audio data that includes multiple independent audio channels. Multichannel audio may be processed similarly to single channel audio, as described above, but with the addition of processing each channel of the input audio using the audio super resolution model.

In some embodiments, the batch manager 300 can divide each channel into batches, and then each channel batch into sub-batches. For example, as shown in FIG. 5, the first channel batch 502, the second channel batch 504, up to the Nth channel sub-batch 506, may each be divided into four sub-batches. Processing then proceeds substantially as described above with respect to FIG. 3. For example, each sub-batch is processed by resampling manager 104 before being processed by the audio super resolution model 108 (or multiple clones of the model). The audio stitching manager 302 then reassembles each channel batch using the bandwidth extended audio received from the audio super resolution model. This processing then continues until all batches have been processed and the full-band multichannel audio data 508 is output.

Figure 6:
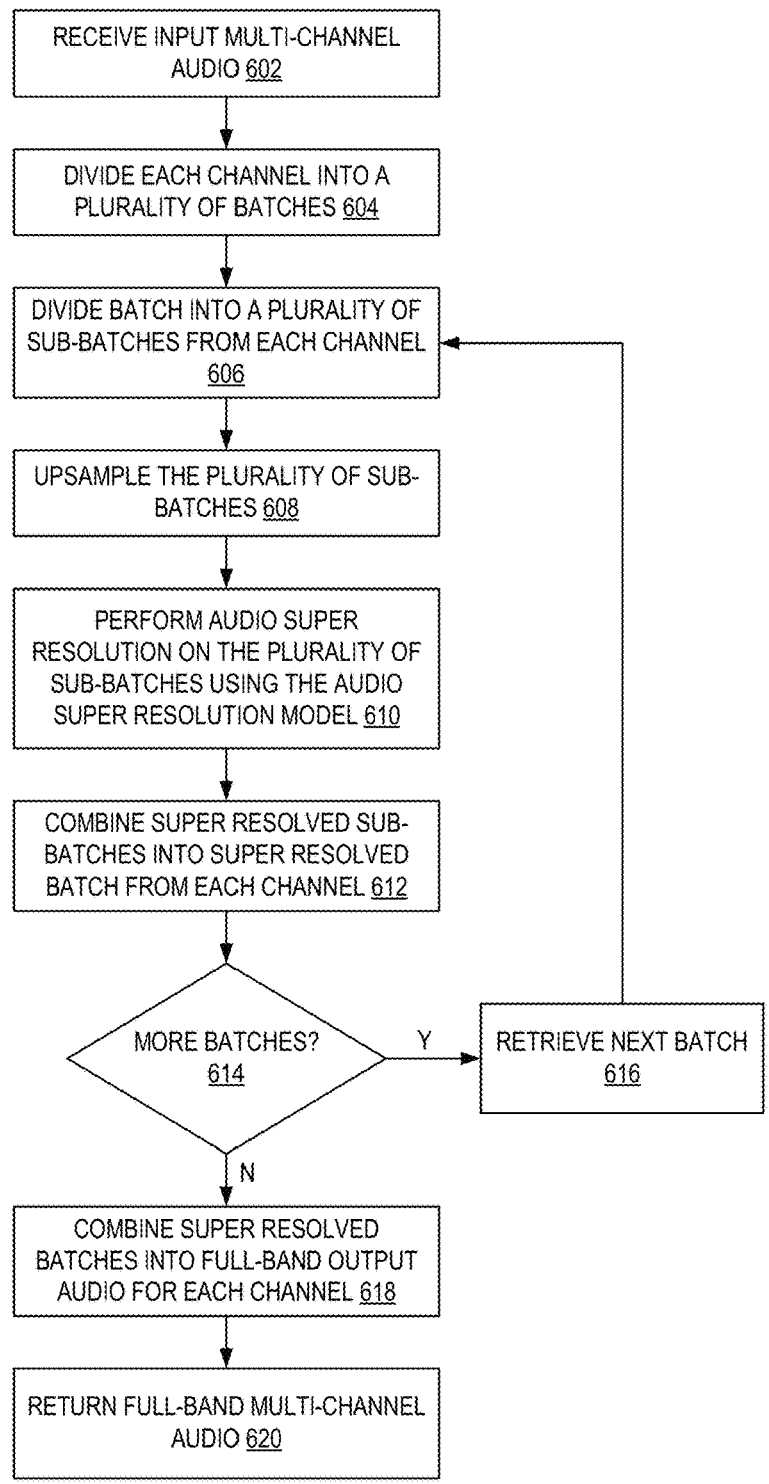
FIG. 6 illustrates a method of batch processing of multichannel audio data to perform audio super resolution model in accordance with one or more embodiments.

FIG. 6 illustrates a method of batch processing of multichannel audio data to perform audio super resolution model in accordance with one or more embodiments. As shown in FIG. 6, the multichannel input audio is received at 602. Each channel of the multichannel input audio is then divided into a plurality of batches at 604. As discussed, this may include fixed or variable sized batches. A first batch for processing can then be divided into a plurality of sub-batches at 606 which will be processed in parallel to improve processing time. The first batch may include a batch from each channel. For example, batch 1 may include batch 1 from channel 1, batch 1 from channel 2, . . . , and batch 1 from channel N. As a result, the sub-batches include sub-batches from each channel. In some embodiments, the batch size may be selected based on the number of channels in addition to the available resource considerations discussed above.

As discussed, the audio associated with each sub-batch is resampled at 608. For example, 16 kHz input audio data is upsampled to at least 44 kHz audio data. The upsampled sub-batches are then provided to the audio super resolution model which generates bandwidth extended audio for each sub-batch at 610. The bandwidth extended sub-batches are then combined into a bandwidth extended batch for each channel at 612. At 614, it is determined whether there are any remaining batches to be processed. If so, at 616, the next batch is retrieved, and processing returns to 606. If there are no batches remaining, then the bandwidth extended batches are combined into the full-band output audio for each channel at 618 and the resulting full-band multichannel output audio is returned at 620.

Figure 7:
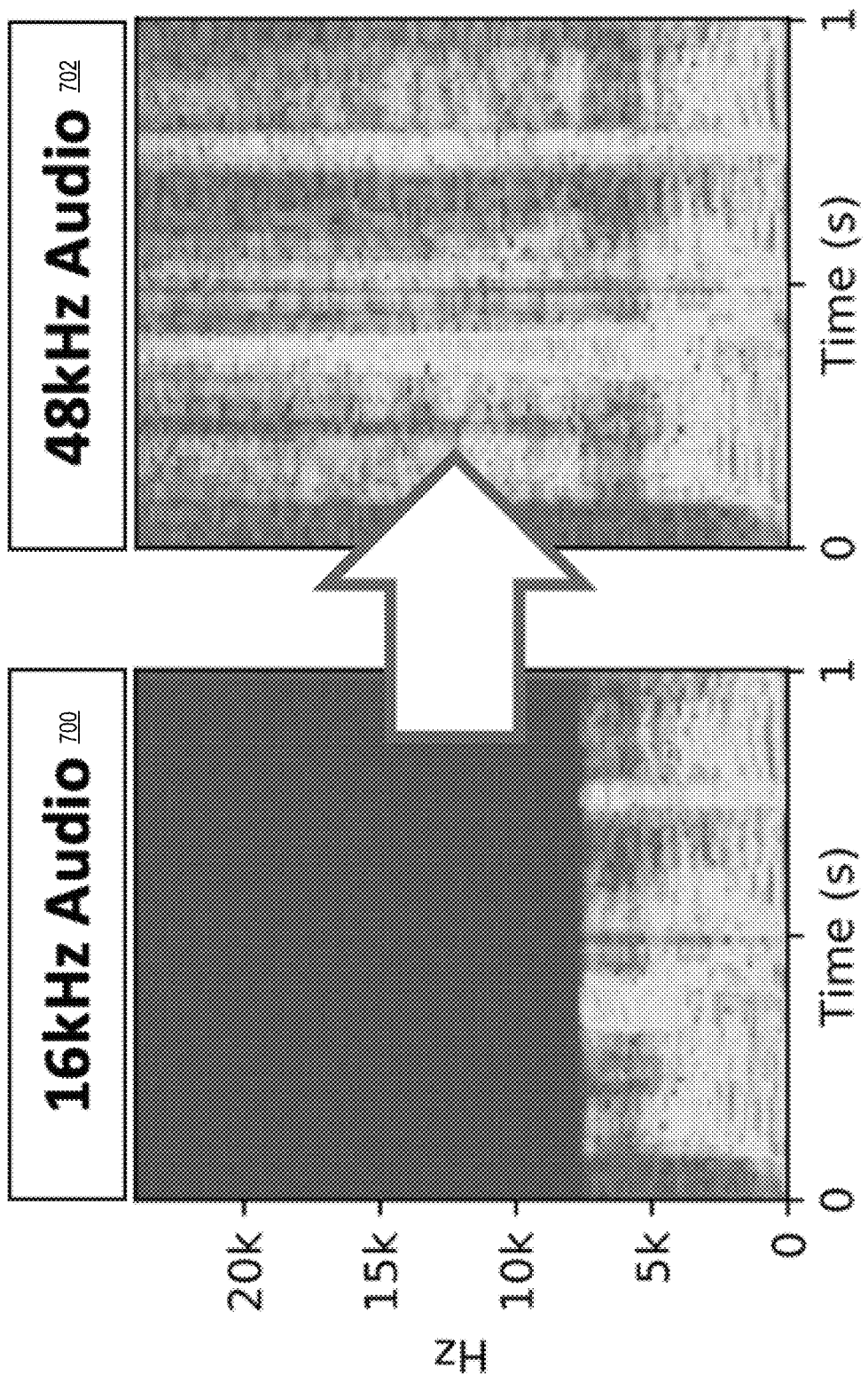
FIG. 7 illustrates an example of audio super resolution in accordance with one or more embodiments.

FIG. 7 illustrates an example of audio super resolution in accordance with one or more embodiments. The example of FIG. 7 shows the results of audio super resolution when performed on input 16 kHz audio data 700 to create full-band 48 kHz audio data 702. As shown in the spectrogram of the 16 kHz audio data 700, there is no audio content at any frequency above 8 kHz. Once audio super resolution has occurred, the resulting full-band audio data 702 includes plausible details for the missing frequencies, without introducing blurred energy or artifacts.

Figure 8:
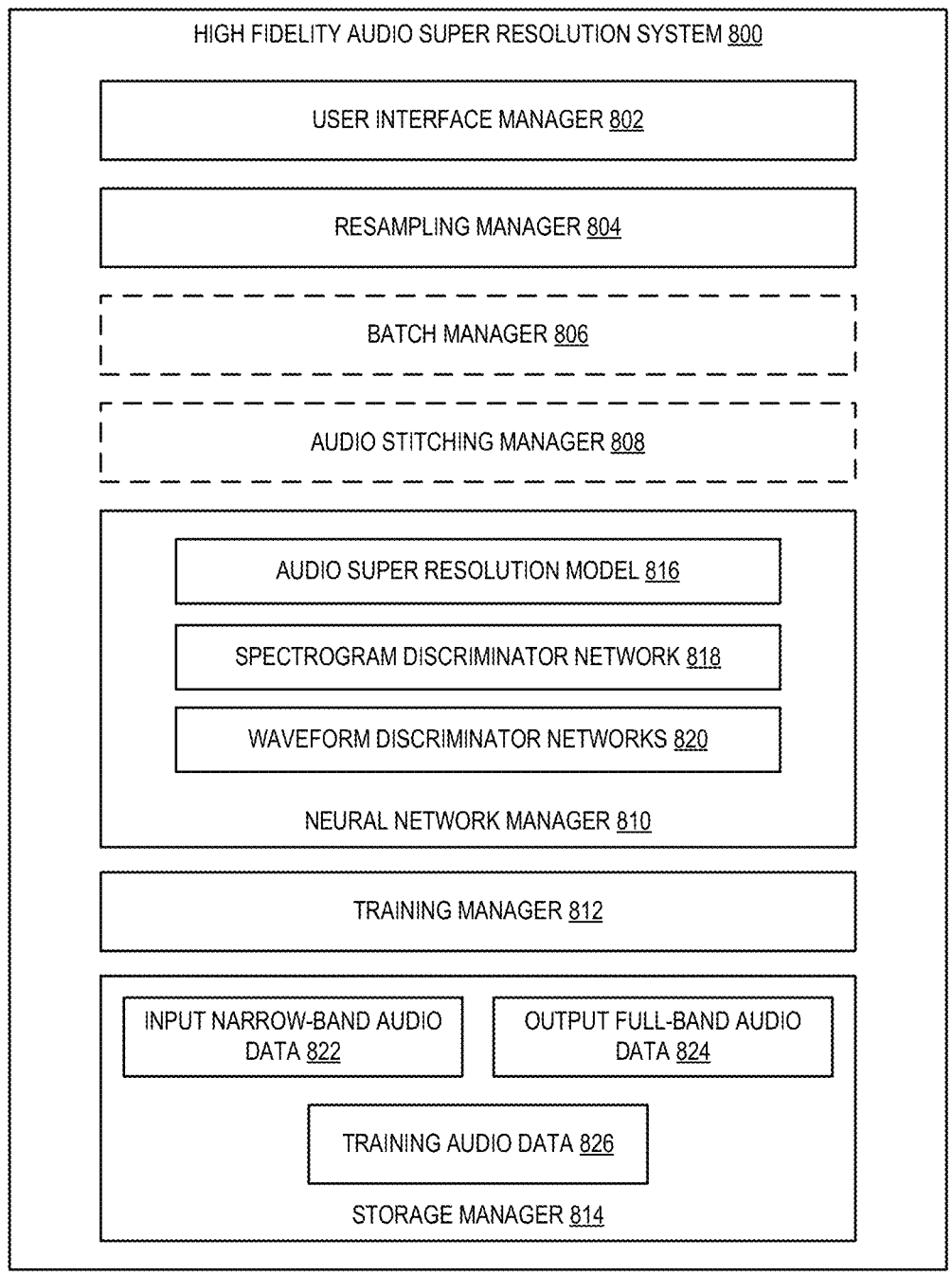
FIG. 8 illustrates a schematic diagram of high-fidelity audio super resolution system in accordance with one or more embodiments.

FIG. 8 illustrates a schematic diagram of a high-fidelity audio super resolution system (e.g., "high-fidelity audio super resolution system" described above) in accordance with one or more embodiments. As shown, the high-fidelity audio super resolution system 800 may include, but is not limited to, a user interface manager 802, a resampling manager 804, a batch manager 806, an audio stitching manager 808, a neural network manager 810, a training manager 812, and a storage manager 814. The neural network manager 810 includes an audio super resolution model 816, a spectrogram discriminator network 818, and a waveform discriminator network 820. The storage manager 814 includes input narrow-band audio data 822, output full-band audio data 824, and training audio data 826.

As illustrated in FIG. 8, the high-fidelity audio super resolution system 800 includes a user interface manager 802. For example, the user interface manager 802 allows users to provide input audio data to the high-fidelity audio super resolution system 800. In some embodiments, the user interface manager 802 provides a user interface through which the user can upload an audio file that includes the input audio data. Alternatively, or additionally, the user interface may enable the user to stream audio, either by providing an address (e.g., a URL or other endpoint) associated with a streaming audio source. In some embodiments, the user interface can enable a user to link an audio capture device, such as a microphone or other hardware to capture live audio and provide it to the high-fidelity audio super resolution system 800. In some embodiments, the user interface manager 802 enables the user to select a specific portion of the audio input for processing. For example, the user interface may allow the user to enter time codes, position play heads, or otherwise indicate a start and stop time within the input audio to be processed. Additionally, the user interface manager 802 allows users to request the high-fidelity audio super resolution system 800 to generate full-band audio data from the provided input audio data.

As illustrated in FIG. 8, the high-fidelity audio super resolution system 800 also includes a resampling manager 804. As discussed, the audio super resolution model does not perform upsampling. Instead, the narrowband input audio is first resampled to match the length of the full-band output audio before being provided to the audio super resolution model. The resampling manager 804 is responsible for resampling the input audio to match the length of the output audio. As discussed, the resampling manager 804 can implement common upsampling and anti-aliasing techniques to appropriately resample the input audio without adding artifacts to the input audio before providing the resampled audio to the next component of the high-fidelity audio super resolution system.

As illustrated in FIG. 8, the high-fidelity audio super resolution system 800 may also include a batch manager 806 and an audio stitching manager 808. As discussed, to improve processing times, in some embodiments, the high-fidelity audio super resolution system 800 can enable parallel processing of the input audio. This may be implemented by dividing the input audio into batches by batch manager 806. The audio may be divided into equal sized batches, fixed size batches, or variable sized batches, depending on implementation. In some embodiments, batch size may be a user-configurable parameter. Each batch may then be processed in parallel. For example, the batch may be divided into equal sized sub-batches that are then processed by the audio super resolution model. The resulting bandwidth extended sub-batches are then combined back into batches by audio stitching manager 808. Processing may continue until all batches have been processed and the output audio is combined from the bandwidth extended batches by the audio stitching manager 808.

As illustrated in FIG. 8, the high-fidelity audio super resolution system 800 also includes a neural network manager 810. Neural network manager 810 may host one or more neural networks or other machine learning models, such as audio super resolution model 816, spectrogram discriminator network 818, and waveform discriminator networks 820. The neural network manager 810 may include an execution environment, libraries, and/or any other data needed to execute the machine learning models. In some embodiments, the neural network manager 810 may be associated with dedicated software and/or hardware resources to execute the machine learning models. As discussed, the audio super resolution model 816 may be implemented as a feedforward WaveNet model trained to perform high fidelity bandwidth extension from 8 or 16 kHz (or other value less than 44 kHz) to 44 kHz or greater. In some embodiments, during training, the spectrogram discriminator 818 may perform discrimination on a spectrogram representation of the waveform output by the audio super resolution model. In some embodiments, the spectrogram discriminator 818 may include four stacks of 2D convolution layers, batch normalization and Gated Linear Unit (GLU), and lastly a convolution layer followed by global average pooling. As discussed, multiple waveform discriminators 820 may be used to operate at the fullband signal downsampled by different ratios as a power of two (e.g., for BWE from 8 kHz to 48 kHz, embodiments may use four waveform discriminators operating at 48 kHz, 24 kHz, 12 kHz and 6 kHz sampled versions of the fullband signal). Each waveform discriminator may include a set of grouped convolutions and global average pooling at the end, with Leaky Relu used between the layers.

As illustrated in FIG. 8 the high-fidelity audio super resolution system 800 also includes training manager 812. The training manager 812 can teach, guide, tune, and/or train one or more neural networks. In particular, the training manager 812 can train a neural network based on a plurality of training data (e.g., training audio data 826). As discussed, the training audio data 826 may include fullband recordings, such as from a library of recordings or other source. The fullband recordings may be downsampled to narrowband (e.g., 16 kHz or 8 kHz) and the resulting fullband-narrowband pairs may be used to train the neural networks. In some embodiments, to more closely replicate the data that will be seen at test time, the training audio data 826 may also be augmented with noise data, as discussed above. More specifically, the training manager 812 can access, identify, generate, create, and/or determine training input and utilize the training input to train and fine-tune a neural network. For instance, the training manager 812 can train the audio super resolution model 816, spectrogram discriminator network 818, and the waveform discriminator networks 820, as discussed above.

As illustrated in FIG. 8, the high-fidelity audio super resolution system 800 also includes the storage manager 814. The storage manager 814 maintains data for the high-fidelity audio super resolution system 800. The storage manager 814 can maintain data of any type, size, or kind as necessary to perform the functions of the high-fidelity audio super resolution system 800. The storage manager 814, as shown in FIG. 8, includes input narrowband audio data 822. Input narrowband audio data 822 can include any narrowband (e.g., 16 kHz or less) audio data utilized by the high-fidelity audio super resolution system 800. For example, input narrowband audio data 822 may include a digital audio file, digital audio stream, etc. provided by a user, where the user seeks to generate fullband audio corresponding to the narrowband audio. The storage manager 814 may also maintain the output fullband audio generated for the input narrowband audio, as discussed above.

The storage manager 814 may also include the training audio data 826. The training audio data 826 can include a plurality of full band audio files, as discussed in additional detail above. In some embodiments, the training audio data can be downsampled to obtain corresponding narrowband training audio data. The fullband and narrowband training audio pairs can be used to train the neural networks, as discussed above.

Embodiments described above outperform existing techniques when applied to bandwidth extension. For example, embodiments compare favorably to a number of state-of-the-art baselines, such as linear prediction based analysis synthesis (LP), a time-domain method using EnvNet structure with GAN (Time), a spectral-domain method using 1D convolutional U-Net with GAN (Spec), and an FFTNet variant for BWE (FFTNet). Although state-of-the-art, these techniques, except for FFTNet were originally designed for bandwidth extension up to 16 kHz and therefore required modification to be used for high fidelity bandwidth extension.

Additionally, for experimentation purposes, embodiments use the VCTK dataset to train models for both 8 kHz to 48 kHz and 16 kHz to 48 kHz extensions, in which the first 99 speakers from the dataset are used for training and the remaining 9 speakers for validation. The evaluation is then conducted on a separate dataset: the Device and Produced Speech (DAPS) Dataset's clean set using the last four male and four female voices. Note that the DAPS dataset has different recording conditions from the VCTK dataset in that VCTK contains slight background noise in the recordings while DAPS is made in studio and has been professionally treated.

It was determined that traditional metric, such as peak signal to noise (PSNR) and log-spectral distance (LSD) do not correlate well with perceptual quality. Any processing to the narrowband input simply lowers its PSNR. Also GAN-based methods learn to generate plausible high frequencies rather than the exact same as ground truth, and thus their objective scores tend to be lower. In contrast, the methods trained with just spectrogram loss (FFTNet, Base) achieve smallest LSD but their results contain noticeable artifacts, possibly due to over-fitting to matching the spectrogram which introduces over-smoothing effects.

Therefore a subjective evaluation was performed using Mechanical Turk. In this experiment, a subject needs to first pass a pre-test to identify 44 kHz recordings out of 5 recordings (the other 4 are 16 kHz or less). This is to make sure the subjects are using headphones and can hear high frequencies. The pre-test is followed by a series of Mean Opinion Score (MOS) tests, where a subject is asked to rate the sound quality of an audio recording on a scale of 1 to 5, with 1=Bad, 5=Excellent. The audio recordings are randomly picked from the results of the seven methods (three ours and four baselines), as well as 8 kHz, 16 kHz and 48 kHz versions of the clean recordings. Also included, were four validation tests to exclude workers who are not paying attention. 382 unique workers participated in this experiment, and 23,400 ratings were collected in total.

Figure 9:
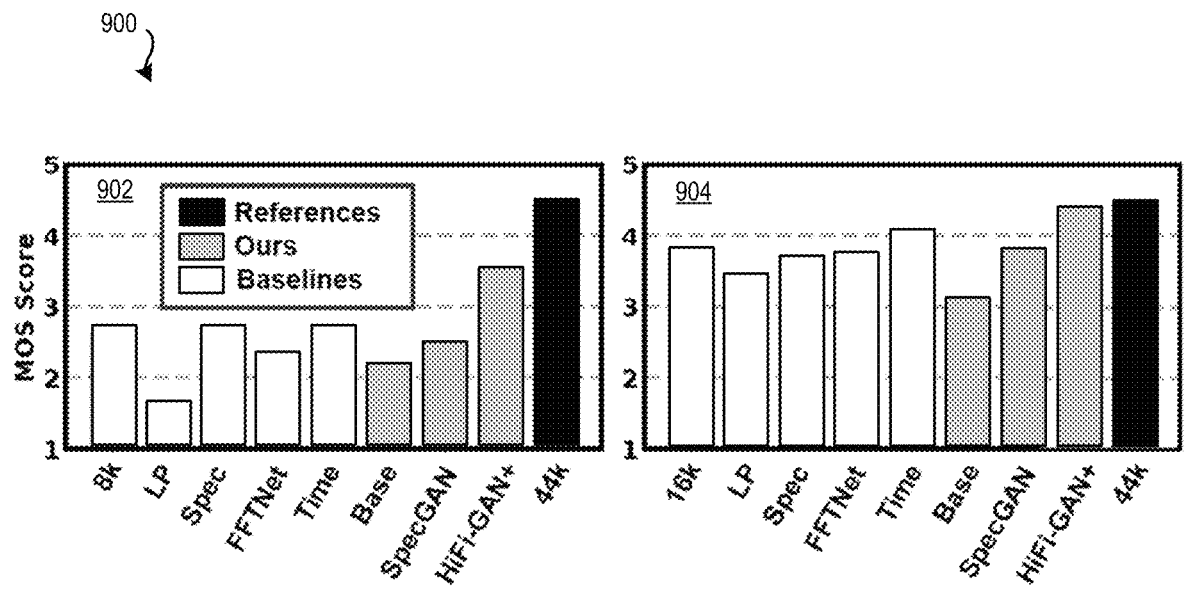
FIG. 9 illustrates an example comparison of perceptual results of different bandwidth extension in accordance with one or more embodiments.

FIG. 9 illustrates an example comparison of perceptual results of different bandwidth extension in accordance with one or more embodiments. In particluar, FIG. 9 illustrates the MOS scores of each technique. Chart 902 shows BWE from 8 kHz to 48 kHz, in which embodiments described herein significantly outperforms all baselines by a large margin. Chart 904 shows BWE from 16 kHz to 48 kHz. Visually, all BWE methods perform well while embodiments described herein display the highest MOS (4.35).

As shown in Chart 904, the full bandwidth recording has a MOS score of 4.48 and it is not statistically significant enough to say that the results generated by embodiments described herein are inferior to real 48 kHz samples. Therefore an additional pairwise comparison study (AB test) was conducted to reveal the actual gap between the embodiments described herein and real 48 kHz samples. In this AB test, a subject is presented with two audio clips, the real 48 kHz recording and the 16 kHz recording expanded to 48 kHz using the audio super resolution techniques described herein. The task is to select the sample with better fidelity. The test used the same pre-test and validation strategy presented before. During this experiment, 2675 answers were collected from 200 subjects, in which 1139 prefers audio generated using the audio super resolution model and 1536 prefers the real samples. This means 42.6% cases people prefer audio generated using the described techniques; or in average 85.2% of the subjects have no preference and thus answers randomly. Though there is still a small gap between the generated audio samples and the real 48 kHz samples, it is fair to say that the techniques described herein to improve fidelity of 16 kHz audio to 48 kHz results in generated audio that is typically indistinguishable from real 48 kHz samples.

Returning to FIG. 8, each of the components 802-814 of the high-fidelity audio super resolution system 800 and their corresponding elements (as shown in FIG. 8) may be in communication with one another using any suitable communication technologies. It will be recognized that although components 802-814 and their corresponding elements are shown to be separate in FIG. 8, any of components 802-814 and their corresponding elements may be combined into fewer components, such as into a single facility or module, divided into more components, or configured into different components as may serve a particular embodiment.

The components 802-814 and their corresponding elements can comprise software, hardware, or both. For example, the components 802-814 and their corresponding elements can comprise one or more instructions stored on a computer-readable storage medium and executable by processors of one or more computing devices. When executed by the one or more processors, the computer-executable instructions of the high-fidelity audio super resolution system 800 can cause a client device and/or a server device to perform the methods described herein. Alternatively, the components 802-814 and their corresponding elements can comprise hardware, such as a special purpose processing device to perform a certain function or group of functions. Additionally, the components 802-814 and their corresponding elements can comprise a combination of computer-executable instructions and hardware.

Furthermore, the components 802-814 of the high-fidelity audio super resolution system 800 may, for example, be implemented as one or more stand-alone applications, as one or more modules of an application, as one or more plug-ins, as one or more library functions or functions that may be called by other applications, and/or as a cloud-computing model. Thus, the components 802-814 of the high-fidelity audio super resolution system 800 may be implemented as a stand-alone application, such as a desktop or mobile application. Furthermore, the components 802-814 of the high-fidelity audio super resolution system 800 may be implemented as one or more web-based applications hosted on a remote server. Alternatively, or additionally, the components of the high-fidelity audio super resolution system 800 may be implemented in a suit of mobile device applications or "apps." To illustrate, the components of the high-fidelity audio super resolution system 800 may be implemented as part of an application, or suite of applications, including but not limited to ADOBE CREATIVE CLOUD, ADOBE PHOTO SHOP, ADOBE ACROBAT, ADOBE ILLUSTRATOR, ADOBE LIGHTROOM and ADOBE INDESIGN. "ADOBE", "CREATIVE CLOUD," "PHOTO SHOP," "ACROBAT," "ILLUSTRATOR," "LIGHTROOM," and "INDESIGN" are either registered trademarks or trademarks of Adobe Inc. in the United States and/or other countries.

Figure 10:
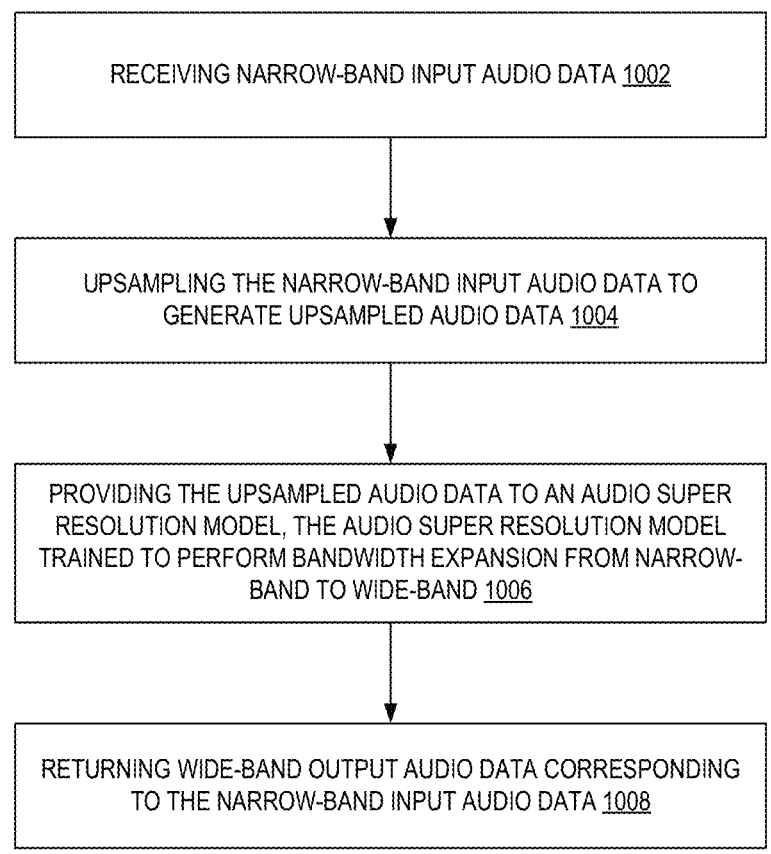
FIG. 10 illustrates a flowchart of a series of acts in a method of performing high fidelity audio super resolution to generate wideband audio from narrowband audio in accordance with one or more embodiments.

FIGS. 1-8, the corresponding text, and the examples, provide a number of different systems and devices that perform high fidelity audio super resolution. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of performing high fidelity audio super resolution in accordance with one or more embodiments. In one or more embodiments, the method 1000 is performed in a digital medium environment that includes the high-fidelity audio super resolution system 800. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving narrow-band input audio data. For example, in some embodiments, the user may provide a digital audio file that includes the narrowband input audio data. Alternatively, the user may provide a link to a location where the input audio data is located, such as a file system location, service or web-based endpoint, remote storage location, etc. In some embodiments, the input audio data may be streamed to from a narrowband audio source, such as a telephony system, recording device, web service, etc. As discussed, the input audio data may include single or multichannel audio data. In some embodiments, the narrow-band input audio data includes audio recordings of speech.

As illustrated in FIG. 10, the method 1000 includes an act 1004 upsampling the narrow-band input audio data to generate upsampled audio data. As discussed, the narrowband audio data may be resampled before it is processed by the audio super resolution model. This allows for conventional resampling and anti-aliasing techniques to be used rather than relying on the audio super resolution model to also resample the input audio, which may introduce artifacts to the audio data. For example, if the input audio data is 16 kHz and the output audio data is to be 48 kHz, then the input 16 kHz audio data may be upsampled to 48 kHz before it is provided to the audio super resolution model.

As illustrated in FIG. 10, the method 1000 includes an act 1006 providing the upsampled audio data to an audio super resolution model, the audio super resolution model trained to perform bandwidth expansion from narrow-band to wide-band. In some embodiments, the audio may be processed in parallel by dividing the audio into batches. Each batch may then be processed by dividing the batch into sub-batches, with each sub-batch being processed in parallel. The resulting bandwidth extended sub-batches are then combined back into a now-bandwidth extended batch. Processing may proceed until all batches have been processed and the output audio data assembled from the processed batches. As discussed, processing of single or multichannel audio data may be performed similarly via batching.

As illustrated in FIG. 10, the method 1000 includes an act 1008 returning wide-band output audio data corresponding to the narrow-band input audio data. In some embodiments, the narrow-band input audio data is 8 or 16 kHz audio data and wherein the wide-band output audio data is at least 44 kHz audio data. As discussed, the narrowband audio data may include higher or lower bandwidth audio data.

In some embodiments, as discussed, the audio super resolution model is a generator model trained as part of a generative adversarial network. In some embodiments, training the audio super resolution model comprises obtaining training audio data, generating, by the audio super resolution model, wide-band generated audio based on the training audio data, analyzing the wide-band generated audio by a plurality of discriminators, comparing outputs of the plurality of discriminators to the training audio data using a loss function, and training the audio super resolution model and the plurality of discriminators based on the comparison. In some embodiments, the plurality of discriminators includes a spectrogram discriminator and a plurality of waveform discriminators, wherein a first waveform discriminator operates on the wide-band generated audio and each remaining waveform discriminator operates on a downsampled version of the wide-band generated audio.

In some embodiments, obtaining training audio data further comprises obtaining wide-band training audio data and generating the training audio data by downsampling the wide-band training audio data to a narrowband range. In some embodiments, generating the training audio data by downsampling the wide-band training audio data to a narrowband range, further comprises augmenting the training audio data with noise randomly selected from a noise dataset.

Figure 11:
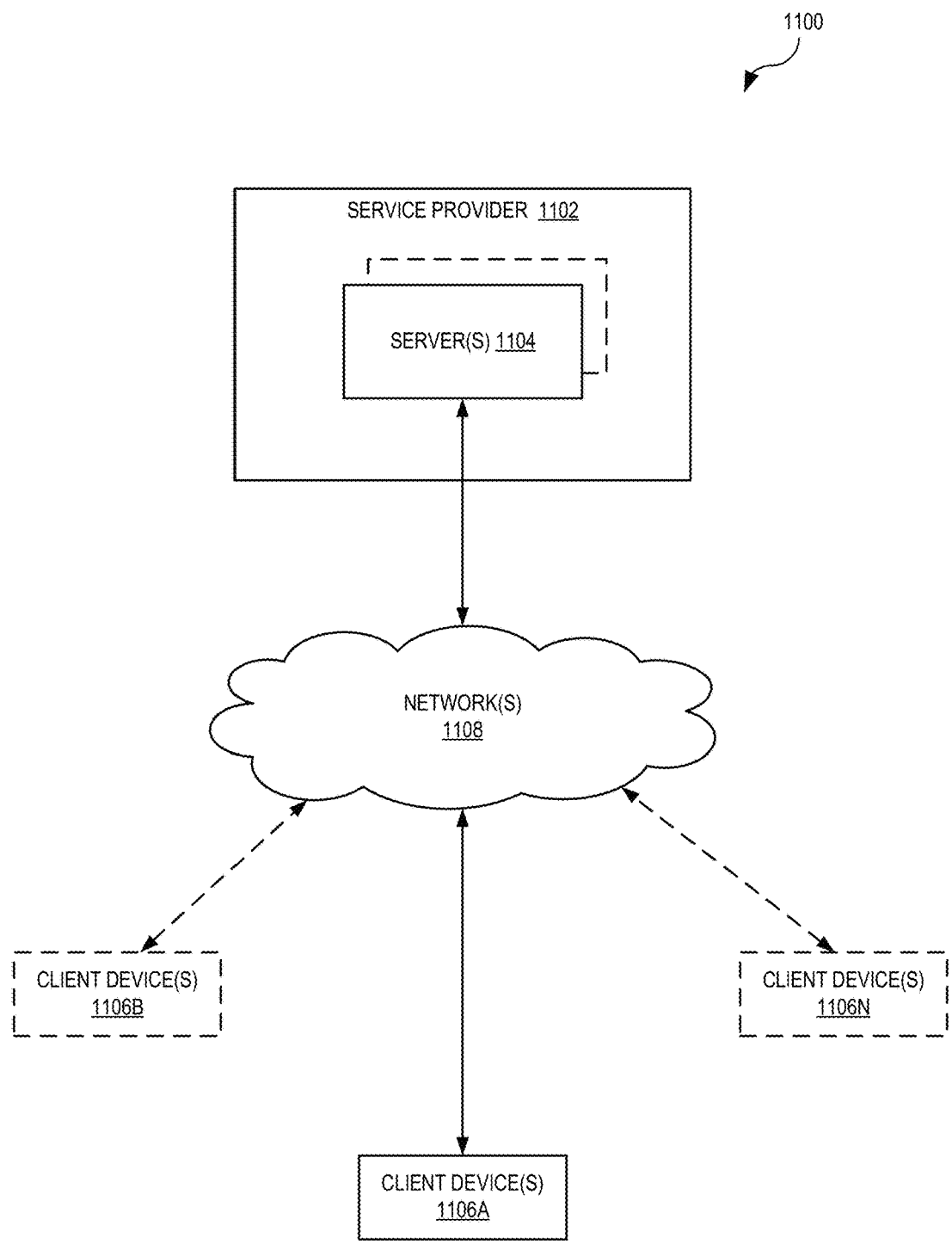
FIG. 11 illustrates a schematic diagram of an exemplary environment in which the image processing system can operate in accordance with one or more embodiments.

FIG. 11 illustrates a schematic diagram of an exemplary environment 1100 in which the high-fidelity audio super resolution system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the high-fidelity audio super resolution system 800. In particular, the high-fidelity audio super resolution system 800 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including input narrowband audio data 822, output fullband audio data 824, training audio data 826, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the high-fidelity audio super resolution system 800. In particular, the high-fidelity audio super resolution system 800 can comprise an application running on the one or more servers 1104 or a portion of the high-fidelity audio super resolution system 800 can be downloaded from the one or more servers 1104. For example, the high-fidelity audio super resolution system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital audio (e.g., digital audio files, digital audio streams, etc.) stored at, or accessible by, the one or more servers 1104. Moreover, the client device 1106A can receive a request (i.e., via user input) to generate fullband audio from the input narrowband audio and provide the request to the one or more servers 1104. Upon receiving the request, the one or more servers 1104 can automatically perform the methods and processes described above to generate the fullband audio. The one or more servers 1104 can provide the generated audio, to the client device 1106A for playback or other use by the user.

As just described, the high-fidelity audio super resolution system 800 may be implemented in whole, or in part, by the individual elements 1102-1108 of the environment 1100. It will be appreciated that although certain components of the high-fidelity audio super resolution system 800 are described in the previous examples with regard to particular elements of the environment 1100, various alternative implementations are possible. For instance, in one or more embodiments, the high-fidelity audio super resolution system 800 is implemented on any of the client devices 1106A-N. Similarly, in one or more embodiments, the high-fidelity audio super resolution system 800 may be implemented on the one or more servers 1104. Moreover, different components and functions of the high-fidelity audio super resolution system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
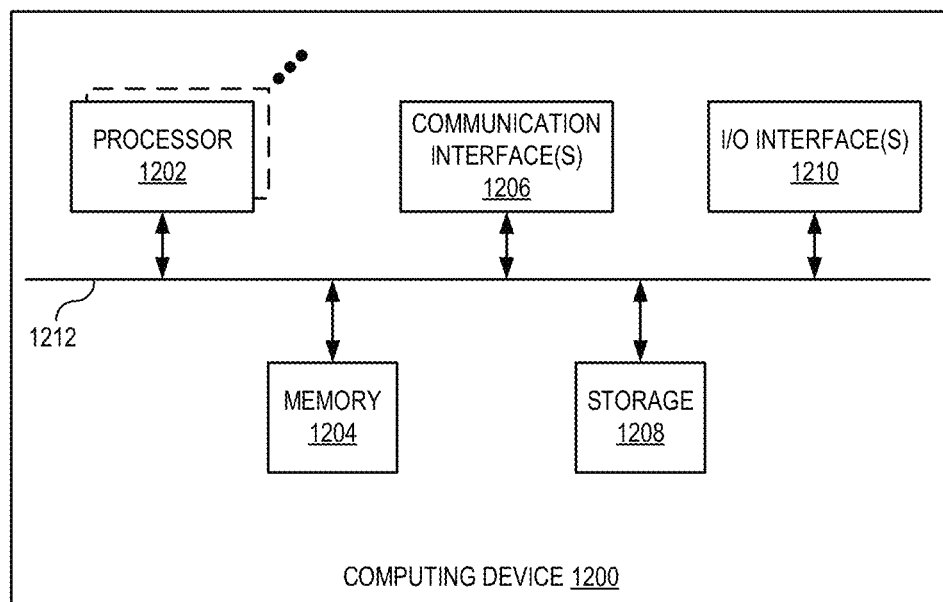
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
receiving narrow-band input audio data;
dividing the narrow-band input audio data into a plurality of batches;
upsampling each batch of the narrow-band input audio data to generate upsampled audio batch data;
providing the upsampled audio batch data to an audio super resolution model, wherein the audio super resolution model is a generator neural network trained as part of a generative adversarial network (GAN) to generate wide-band audio data from narrow-band audio data;
generating, by the audio super resolution model, wide-band audio batch data corresponding to each batch of the plurality of batches, the wide-band audio batch data including high frequency data not included in the narrow-band input audio data;
combining the wide-band audio batch data corresponding to each batch of the plurality of batches to form wide-band output audio data; and
returning the wide-band output audio data corresponding to the narrow-band input audio data.

2. The computer-implemented method of claim 1, wherein the narrow-band input audio data is 8 or 16 kHz audio data and wherein the wide-band output audio data is at least 44 kHz audio data.

3. The computer-implemented method of claim 1, wherein training the audio super resolution model comprises:
obtaining training audio data;
generating, by the audio super resolution model, wide-band generated audio based on the training audio data;
analyzing the wide-band generated audio by a plurality of discriminators;
comparing outputs of the plurality of discriminators to the training audio data using a loss function; and
training the audio super resolution model and the plurality of discriminators based on the comparison.

4. The computer-implemented method of claim 3, wherein the plurality of discriminators includes a spectrogram discriminator and a plurality of waveform discriminators, wherein a first waveform discriminator operates on the wide-band generated audio and each remaining waveform discriminator operates on a downsampled version of the wide-band generated audio.

5. The computer-implemented method of claim 3, wherein obtaining training audio data further comprises:
obtaining wide-band training audio data; and
generating the training audio data by downsampling the wide-band training audio data to a narrowband range.

6. The computer-implemented method of claim 5, wherein generating the training audio data by downsampling the wide-band training audio data to a narrowband range, further comprises:
augmenting the training audio data with noise randomly selected from a noise dataset.

7. The computer-implemented method of claim 1, wherein the narrow-band input audio data includes audio recordings of speech.

8. A non-transitory computer-readable storage medium including instructions stored thereon which, when executed by at least one processor, cause the at least one processor to:
receive narrow-band input audio data;
divide the narrow-band input audio data into a plurality of batches;
upsample each batch of the narrow-band input audio data to generate upsampled audio batch data;
provide the upsampled audio batch data to an audio super resolution model, wherein the audio super resolution model is a generator neural network trained as part of a generative adversarial network (GAN) to generate wide-band audio data from narrow-band audio data;
generate, by the audio super resolution model, wide-band audio batch data corresponding to each batch of the plurality of batches, the wide-band audio batch data including high frequency data not included in the narrow-band input audio data;

combine the wide-band audio batch data corresponding to each batch of the plurality of batches to form wide-band output audio data; and return the wide-band output audio data corresponding to the narrow-band input audio data.

9. The non-transitory computer-readable storage medium of claim 8, wherein the narrow-band input audio data is 8 or 16 kHz audio data and wherein the wide-band output audio data is at least 44 kHz audio data.

10. The non-transitory computer-readable storage medium of claim 8, wherein training the audio super resolution model comprises:

obtaining training audio data;

generating, by the audio super resolution model, wide-band generated audio based on the training audio data;

analyzing the wide-band generated audio by a plurality of discriminators;

comparing outputs of the plurality of discriminators to the training audio data using a loss function; and training the audio super resolution model and the plurality of discriminators based on the comparison.

11. The non-transitory computer-readable storage medium of claim 10, wherein the plurality of discriminators includes a spectrogram discriminator and a plurality of waveform discriminators, wherein a first waveform discriminator operates on the wide-band generated audio and each remaining waveform discriminator operates on a down-sampled version of the wide-band generated audio.

12. The non-transitory computer-readable storage medium of claim 10, wherein obtaining training audio data further comprises:

obtaining wide-band training audio data; and generating the training audio data by downsampling the wide-band training audio data to a narrowband range.

13. The non-transitory computer-readable storage medium of claim 12, wherein generating the training audio data by downsampling the wide-band training audio data to a narrowband range, further comprises:

augmenting the training audio data with noise randomly selected from a noise dataset.

14. The non-transitory computer-readable storage medium of claim 8, wherein the narrow-band input audio data includes audio recordings of speech.

15. A system comprising:

a processor; and a memory including instructions stored thereon which, when executed by the processor, cause the system to:

receive narrow-band input audio data;

divide the narrow-band input audio data into a plurality of batches;

upsample each batch of the narrow-band input audio data to generate upsampled audio batch data;

provide the upsampled audio batch data to an audio super resolution model, wherein the audio super resolution model is a generator neural network trained as part of a generative adversarial network (GAN) to generate wide-band audio data from narrow-band audio data;

generate, by the audio super resolution model, wide-band audio batch data corresponding to each batch of the plurality of batches, the wide-band audio batch data including high frequency data not included in the narrow-band input audio data;

combine the wide-band audio batch data corresponding to each batch of the plurality of batches to form wide-band output audio data; and return the wide-band output audio data corresponding to the narrow-band input audio data.

16. The system of claim 15, wherein the narrow-band input audio data is 8 or 16 kHz audio data and wherein the wide-band output audio data is at least 44 kHz audio data.

17. The system of claim 15, wherein to train the audio super resolution model, the system is further to:

obtain training audio data;

generate, by the audio super resolution model, wide-band generated audio based on the training audio data;

analyze the wide-band generated audio by a plurality of discriminators;

compare outputs of the plurality of discriminators to the training audio data using a loss function; and train the audio super resolution model and the plurality of discriminators based on the comparison.

* * * * *